United States Patent [19]

Hines

[11] 4,300,334
[45] Nov. 17, 1981

[54] POWER RAKE FOOT GUARD

[75] Inventor: Charles E. Hines, Lincoln, Nebr.

[73] Assignee: Outboard Marine Corporation, Waukegan, Ill.

[21] Appl. No.: 118,536

[22] Filed: Feb. 4, 1980

[51] Int. Cl.³ .............................................. A01D 67/00
[52] U.S. Cl. ...................................... 56/17.4; 56/320.1
[58] Field of Search .................... 56/17.4, 320.1, 320.2

[56] References Cited

U.S. PATENT DOCUMENTS

| 3,501,902 | 3/1970 | Dahl et al. | 56/17.4 |
| 4,028,868 | 6/1977 | Zehrung | 56/320.1 |
| 4,172,351 | 10/1979 | Scanland | 56/17.4 |

Primary Examiner—Robert A. Hafer
Attorney, Agent, or Firm—Michael, Best & Friedrich

[57] ABSTRACT

A power rake comprises spaced apart front and rear axles and ground engaging wheels mounted on the axles. A housing is supported on the axles for wheeled movement over the ground as well as for generally vertical adjustment relative to the ground. A reel member is carried by the housing parallel to and between the axles for rotation about an axis fixed relative to the housing. A side plate or foot guard is supported on the axles independently of the housing. The foot guard includes a lower edge which is maintained in a closely spaced relationship from the ground regardless of the vertical adjustment of the housing relative to the ground.

1 Claim, 3 Drawing Figures

POWER RAKE FOOT GUARD

FIELD OF THE INVENTION

The invention relates generally to power rakes, and, more particularly, to foot guards for power rakes.

DESCRIPTION OF THE PRIOR ART

Attention is directed to the foot guards used in conjunction with lawn care devices disclosed in the following U.S. Pat. Nos.:

Lustyan: 2,977,739—Apr. 4, 1961
Groll: 3,432,183—Mar. 11, 1969
Dahl et al: 3,501,902—Mar. 24, 1970
Irgens: 3,537,720—Nov. 3, 1970
Dahl: 3,799,579—Mar. 26, 1974
Ramaker et al: 3,927,513—Dec. 23, 1975

SUMMARY OF THE INVENTION

The invention provides a power rake comprising spaced apart front and rear axles. Ground engaging wheels are mounted on the axles. A housing is supported on the axles for wheeled movement over the ground as well as for generally vertical adjustment relative to the ground. A reel member is carried by the housing parallel to and between the axles for rotation about an axis fixed relative to the housing. A side plate or foot guard is supported on the axles independently of the housing. The foot guard includes a lower edge and means for maintaining the lower edge in a closely spaced relationship from the ground regardless of the vertical adjustment of the housing relative to the ground.

In one embodiment of the invention, the wheels are rotatably attached on the axles, and the housing includes front and rear end portions. Means is provided for connecting the rear axle on the housing rear end portion. Means is also provided for connecting the front axle on the housing front end portion and includes means for adjusting the housing front end portion relative to the ground and about the rear axle. In this embodiment, the foot guard includes opposite end portions. The means for maintaining the lower edge of the foot guard in a closely spaced relationship from the ground includes rear connecting means for pivotally attaching one end portion of the foot guard on the rear axle between the housing and the associated wheel and front connecting means for attaching the other end portion of the foot guard on the front axle between the housing and the associated wheel so that movement of the front axle relative to the foot guard is accommodated during vertical height adjustment of the housing.

One of the principal features of the invention is the provision of a power rake which is vertically height adjustable relative to the ground and which includes a foot guard which is maintained at a constant, closely spaced distance from the ground regardless of the vertical height adjustment of the housing. The operator and bystanders are thus constantly shielded from contact with the reel member as well as from objects which may be thrown by the reel member, regardless of the position of the housing relative to the ground.

Other features and advantages of the embodiments of the invention will become apparent upon reviewing the following general description, the drawings, and the appended claims.

Figure 1:
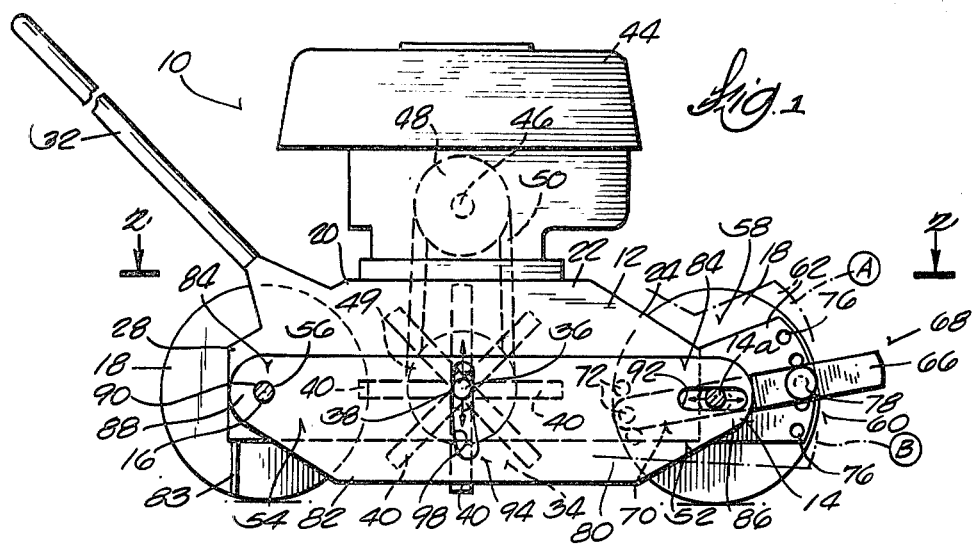
FIG. 1 is a side view of a power rake which embodies various of the features of the invention.

Before explaining the embodiments of the invention in detail, it is to be understood that the invention is not limited in its application to the details of construction and the arrangement of components set forth in the following description or illustrated in the drawings. The invention is capable of other embodiments and of being practiced and carried out in various ways. Also it is to be understood that the phraseology and terminology used herein for the purpose of description should not be regarded as limiting.

GENERAL DESCRIPTION

A power rake 10 is shown in the drawings. Generally, the power rake 10 includes a housing 12 supported for movement over the ground on front and rear axles which are generally designated, respectively, as 14 and 16. Both axles 14 and 16 carry wheels 18.

Figure 3:
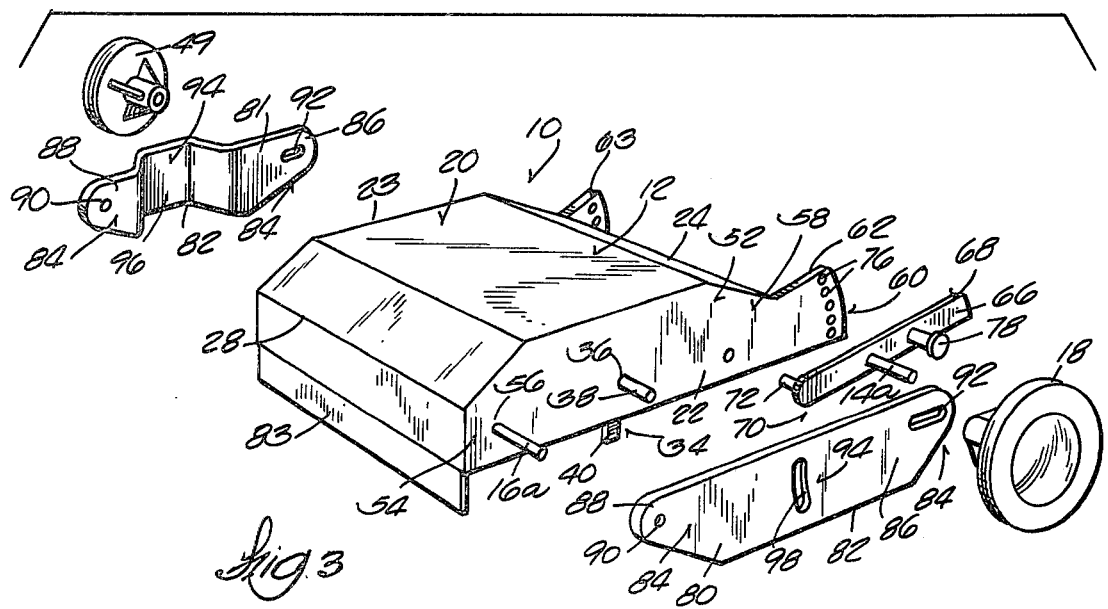
FIG. 3 is an exploded view of the housing and associated foot guard of the power rake shown in FIG. 1.

In the illustrated embodiment (as is best shown in FIG. 3), the housing 12 includes a top deck or wall 20, a pair of laterally spaced sidewalls 22 and 23, and front and rear walls, respectively, 24 and 28. A handle 32 (see FIG. 1) extends rearwardly from the housing 12 to guide the wheeled movement of the housing 12 over the ground.

A reel member 34 is supported substantially wholly within the confines of the housing 12. The reel member 34 includes an axle 36 which extends between the sidewalls 22 and 23 and is located parallel to and between the front and rear axles 14 and 16. The axle 36 includes opposite end portions 38 and 39 (see FIG. 2), each of which extends through and outwardly beyond the adjacent supporting sidewall 22 and 23.

The reel member 34 also includes a plurality of blades 40 which extend radially from the axle 36 and which rotate in common with the reel member 34. The blades 40 may be of flexible or "flail-like" construction. Alternatively, the blades 40 may be of inflexible or rigid construction. In either construction, rotation of the bladed reel member 34 serves to rake or otherwise thatch the ground.

Figure 2:
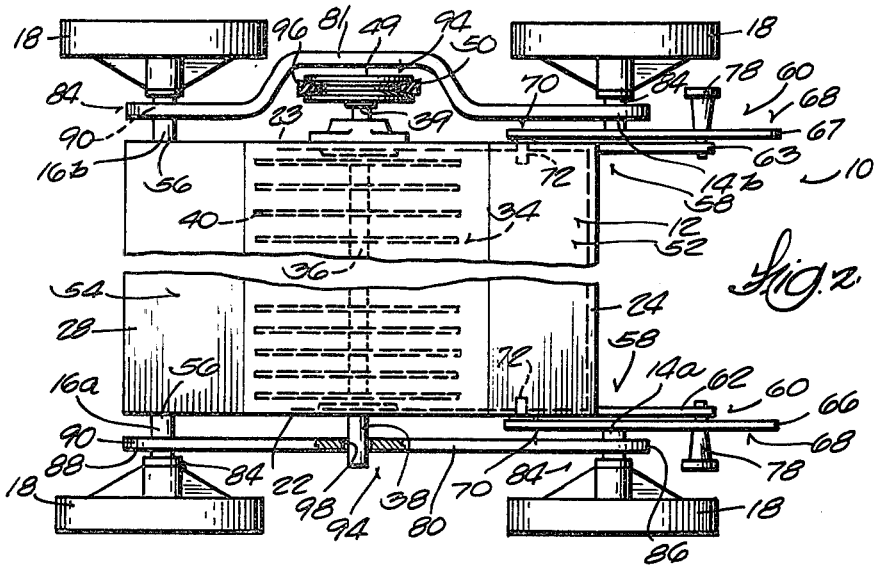
FIG. 2 is a top sectional view of the power rake taken generally along line 2—2 in FIG. 1.

As is shown in FIGS. 1 and 2, a power source 44 is carried on the top wall 20 of the housing 12. In the illustrated embodiment, the power source 44 takes the form of an internal combustion engine having a output shaft 46. The engine 44 is operatively connected to the bladed reel member 34 by means of a pulley 49 (see also FIG. 2) attached on the outwardly projecting end 39 of the reel member axle 36, another pulley 48 attached on the engine output shaft 46, and an endless belt 50 which is reeved around the two pulleys 48 and 49.

In the illustrated embodiment, the housing 12 is supported on the front and rear axles 14 and 16 for generally vertical adjustment relative to the ground. As will be described later herein, vertical adjustment of the housing 12 serves to position the reel member 34 relative to the ground.

More particularly, the housing 12 includes front and rear end portions, respectively, 52 and 54. The rear axle 16 is attached by suitable means 56, such as welding or the like, on the sidewalls 22 and 23 at the rear end portion 54 of the housing 12 such that the axis of rotation of the rear axle 16 is fixed relative to the housing 12. In the illustrated embodiment, the rear axle 16 is not a continuous member, but consists of two independent axle members or rods 16a and 16b (see FIG. 2), each of which is non-rotatably attached to the adjacent sidewall 22 and 23. The rear wheels 18 are attached by suitable means on each of the rear axle members 16a and 16b for rotation.

Means 58 is also provided for attaching the front axle 14 at the front end portion 52 of the housing 12. The means 58 includes means 60 for adjusting the housing front end portion 52 relative to the ground and about the rear axle members 16a and 16b.

More particularly, and while various constructions are possible, in the illustrated embodiment, the means 58 includes an oppositely spaced pair of plates 62 and 63 which extend in a forward direction perpendicularly from the housing front wall 24 and in a generally coplanar relationship with the adjacent housing sidewall 22 and 23. The means 60 for adjusting the housing front end portion 52 includes a pair of adjustment arms 66 and 67, each having opposite end portions 68 and 70. As can be best seen in FIG. 2, one adjustment arm 66 and 67 is associated with each plate 62 and 63. In this construction, and like the heretofore described construction of the rear axle 16, the front axle 14 is not a continuous member, but consists of two independent axle members or rods 14a and 14b (see FIG. 2). Front axle member 14a is non-rotatably attached, such as by welding or the like, to adjustment arm 66 generally between its end portions 68 and 70. In like fashion, front axle member 14b is similarly non-rotatably attached to adjustment arm 67 generally between its end portions 68 and 70. The front wheels 18 are suitably rotatably connected to each front axle member 14a and 14b.

One end 68 of each arm 66 and 67 is pivotally attached by means of bolt 72 or the like to the adjacent sidewall 22 and 23, and the other end 70 of each adjustment arm 66 and 67 extends forwardly of the associated front axle member 14a or 14b and is in generally overlying relationship with the associated plate 62 or 63.

Coordinated pivotal movement of the adjustment arms 66 and 67 about their associated front axle members 14a and 14b serves to raise and lower the front end portion 52 of the housing 12 relative to the ground and about the rear axle members 16a and 16b. Thus, the entire housing 12 can be adjusted between an upwardly tilted position (shown in phantom lines as position A in FIG. 1), in which the tips of the blades 40 of the reel member 34 are located generally above the horizontal plane of the ground, and a downwardly tilted position (shown in phantom lines as Position B in FIG. 1), in which the tips of the blades 40 of the reel member 34 are generally located below the horizontal plane of the ground.

In the illustrated embodiment, each of the plates 62 and 63 includes a series of openings 76 arcuately spaced about the respective front axle member 14a and 14b. A spring-biased locking pin 78 or the like is carried near the forwardly extending end 70 of each arm 66 and 67 for engagement with the openings 76. It is thus possible to selectively lock the the housing 12 at a number of preselected positions at and between the upwardly and downwardly tilted positions.

To protect the operator and bystanders from contact with the reel blades 40 as well as from objects thrown by the reel blades 40, a side plate or foot guard 80 and 81 is supported outwardly of each sidewall 22 and 23 between each side pair of front and rear axle members (i.e., side pair 14a and 16a and side pair 14b and 16b) independently of the housing 12. Each foot guard 80 and 81 includes a lower edge 82 and opposite end portions 86 and 88. Means 84 is provided for maintaining the lower edge 82 of each foot guard 80 and 81 in a closely spaced relationship from the ground regardless of the vertical adjustment of the housing 12 relative to the ground.

In the illustrated embodiment, each foot guard 80 and 81 is located between the adjacent adjustment arm 66 and 67 and wheel 18 (see FIGS. 2 and 3). The means 84 for maintaining the lower edge 82 of each foot guard 80 and 81 close to the ground includes rear connecting means in the form of a bushing 90 or the like which pivotally connects one end portion 88 of each foot guard 80 and 81 to the respective rear axle member 16a and 16b. The means 84 also includes front connecting means in the form of a slot 92 or the like in the other end portion 86 of each foot guard 80 and 81. The slot 92 accommodates passage of the respective front axle member 14a and 14b. The slot 92 also accommodates movement of the front axle members 14a and 14b in a fore and aft (i.e. lateral) direction (as shown by arrows in FIG. 1) relative to the associated foot guard 80 and 81 during pivotal adjustment of the front end portion 52 of the housing 12 relative to the rear axle members 16a and 16b. As can be seen in FIG. 1, the lower edge 82 of each foot guard 80 and 81 is thus maintained at a constant closely-spaced distance above the ground throughout vertical height adjustment of the housing 12 between its upwardly and downwardly tilted positions.

In the illustrated embodiment, each foot guard 80 and 81 also includes means 94 for accommodating up and down, or vertical, movement of the outwardly extending end portions 38 and 39 of the reel member axle 36 occasioned by vertical height adjustment of the housing 12. Two alternate constructions are shown in the drawings.

In the first embodiment, which is shown on foot guard 81, the means 94 takes the form of an outwardly bowed area 96 (see FIGS 2 and 3) on the foot guard 81. The outwardly bowed area 96 accommodates the outwardly extending end 39 of the reel member 34, as well as the associated pulley 49. The outwardly bowed area 96 accommodates vertical movement of reel axle end 39 and associated pulley 49 during height adjustment operations. The outwardly bowed area 96 also serves to shield the pulley 49.

In the alternate embodiment, which is shown on foot guard 80, the means 94 includes a vertical slot 98 in the foot guard 80 (see FIGS. 1 and 3). The slot 98 accommodates passage of the outwardly extending end portion 38 of the reel member axle 34 and permits up and down (i.e. vertical) movement of the reel axle end 38 during height adjustment of the housing 12 (as is shown in by arrows in FIG. 1).

To further protect the operator and bystanders from contact with the reel blades 40 as well as from objects thrown by the reel blades, a shield 83 can extend downwardly from the rear wall (see FIGS. 1 and 3).

Various features of the invention are set forth in the following claims.

I claim:
1. A power rake comprising a housing, a rear axle fixed relative to said housing, a front axle, means mounting said front axle on said housing for vertical adjust- ment relative to said housing, ground engaging wheels rotatably mounted on said axles, a reel member carried by said housing parallel to and between said axles for rotation about an axis fixed relative to said housing, said reel member including an axle supported for rotation about said axis fixed relative to said housing, said reel member axle including an end portion extending outwardly of said housing, a side plate supported on said axles independently of said housing, and intermediate said wheels and said housing, said side plate including a lower edge and opposite end portions, means for accommodating movement of said end portion of said reel member axle relative to said side plate during vertical adjustment of said front axle relative to said housing, rear connecting means for pivotally attaching one of said side plate end portions on said rear axle, and front connecting means for attaching the other one of said side plate end portions on said front axle and for accommodating movement of said front axle relative to said side plate during vertical adjustment of said front axle relative to said housing so as to maintain said lower edge of said side plate in a closely spaced relationship from the ground regardless of the vertical adjustment of said front axle relative to said housing.

* * * * *